(12) United States Patent
Wang

(10) Patent No.: US 10,861,313 B2
(45) Date of Patent: Dec. 8, 2020

(54) PORTABLE MARINE BEACON SYSTEM

(71) Applicants: Yu-Lung Wang, Hsinchu County (TW); Mei-Yun Shen, Taipei (TW)

(72) Inventor: Yu-Lung Wang, Hsinchu County (TW)

( * ) Notice: Subject to any disclaimer, the term of this patent is extended or adjusted under 35 U.S.C. 154(b) by 0 days.

(21) Appl. No.: 16/758,432

(22) PCT Filed: Nov. 1, 2017

(86) PCT No.: PCT/CN2017/108847
§ 371 (c)(1),
(2) Date: Apr. 29, 2020

(87) PCT Pub. No.: WO2019/084831
PCT Pub. Date: May 9, 2019

(65) Prior Publication Data
US 2020/0320842 A1 Oct. 8, 2020

(51) Int. Cl.
| G08B 21/02 | (2006.01) |
| G08B 5/00 | (2006.01) |
| H04W 4/90 | (2018.01) |
| H04W 4/029 | (2018.01) |
| H02J 7/02 | (2016.01) |
| G01S 19/17 | (2010.01) |
| G08B 25/10 | (2006.01) |
| H04W 84/12 | (2009.01) |

(52) U.S. Cl.
CPC .......... *G08B 21/0272* (2013.01); *G01S 19/17* (2013.01); *G08B 5/002* (2013.01); *G08B 21/0261* (2013.01); *G08B 25/10* (2013.01); *H02J 7/02* (2013.01); *H04W 4/029* (2018.02); *H04W 4/90* (2018.02); *H04W 84/12* (2013.01)

(58) Field of Classification Search
CPC .... G08B 21/0272; G08B 5/002; G08B 25/10; H04W 4/029; H04W 4/90; H04W 84/12; G01S 19/17; H02J 7/02
USPC ............................... 340/539.13, 539.11, 850
See application file for complete search history.

(56) References Cited

U.S. PATENT DOCUMENTS

| 4,305,143 | A | * | 12/1981 | Simms | ................... H04B 11/00 367/134 |
| 5,886,635 | A | * | 3/1999 | Landa | .................. B63C 9/0005 340/539.1 |
| 6,057,759 | A | * | 5/2000 | Marsh | ................ G08B 21/0227 340/539.11 |

(Continued)

*Primary Examiner* — Eric Blount

(57) ABSTRACT

Disclosed is a portable marine beacon system, including: at least one transmitter, at least one receiver conducting radio frequency (RF) wireless communication with the at least one transmitter to receive data of the at least one transmitter, and at least one smart handheld device wirelessly communicating with the at least one receiver to assess and process data from the receiver through Wi-Fi communication. The smart device comprises a central processing unit (CPU), a main memory, and a touch screen. The main memory stores a marine beacon manager application (App), and the touch screen is operated to instruct the CPU to execute the App, such that a transmitter management interface, an activity planning interface, a security patrol interface, and a record playback interface can be operated through the touch screen to provide for personal real-time tracking and functions of distress alert and precautionary safety protection for offshore and onshore positioning/rescuing.

15 Claims, 9 Drawing Sheets

(56) References Cited

U.S. PATENT DOCUMENTS

| | | | | |
|---|---|---|---|---|
| 6,222,484 B1* | 4/2001 | Seiple | .................. | B63C 9/0005 |
| | | | | 342/357.55 |
| 7,642,919 B2* | 1/2010 | Leal | ......................... | G01S 5/28 |
| | | | | 340/573.1 |
| 9,869,998 B2* | 1/2018 | Moles | .................... | H04L 67/12 |
| 10,297,158 B2* | 5/2019 | Shedley | ................... | G08G 3/02 |
| 2011/0260923 A1* | 10/2011 | Liao | ........................ | G01S 11/06 |
| | | | | 342/458 |
| 2014/0011471 A1* | 1/2014 | Khosla | ................... | H04W 4/90 |
| | | | | 455/404.2 |
| 2014/0266793 A1* | 9/2014 | Velado | .................. | G08B 25/08 |
| | | | | 340/870.16 |
| 2014/0323079 A1* | 10/2014 | Paolini | ................... | H04W 4/90 |
| | | | | 455/404.2 |
| 2015/0282061 A1* | 10/2015 | Matthews | .............. | H04W 4/90 |
| | | | | 455/404.2 |
| 2016/0159446 A1* | 6/2016 | Covelli | ................... | G08B 5/36 |
| | | | | 340/984 |

* cited by examiner

PORTABLE MARINE BEACON SYSTEM

FIELD OF THE INVENTION

The invention is related to a beacon tracking system, and more particularly to a portable real-time tracking system for providing personal offshore/inland location/danger alert and precautionary safety protection functions for marine activities.

BACKGROUND OF THE INVENTION

With the progress of technology, people tend to embark on various kinds of marine activities. These activities include, for example, canoeing and kayaking, sea fishing, snorkeling, and scuba diving. Before starting these activities, such as scuba diving, the personnel's location must marked firstly to protect him from being hit by vessels, and secondly in case of drastic change in marine weather, the player in water might become untraceable and highly endanger his/her life. Therefore, it is necessary to be able to send a distress signal with location to notify nearby vessels or salvage units to rescue operation.

Here are several examples of marine accidents happened in recent years. On Mar. 5, 2017, a scuba diver from Hong Kong with ten other divers in the Barracuda point of Sipadan island, Malaysia and was perished in a drowning accident. In the early of 2014, a Chinese diver in Phuket island, Thailand was hit in the head by a raging yacht when she surfaced. Besides, in February 2014, seven Japanese tourists went scuba diving in Bali island, Indonesia and were drifted away by strong current to end up with two of them missing. Hence, when people are engaging in marine activities or diving, locator beacon and distress alert are extremely vital for the vessels to identify the position of neighboring divers and marine activity players for avoidance of impacts. When a diver encounters emergent events, a DISTRESS signal is also needed to be sent immediately to request rescue operation.

Please refer to FIGS. 1a and 1b, which respectively show a conventional surface marker buoy 100 used by the divers and a diver holding such surface marker buoy 100. As shown in FIG. 1a, the surface marker buoy 100 is 100-150 centimeters in length and 10-15 centimeters in diameter and is tangerine colored. The surface marker buoy 100 is used to protect the diver from being hit by vessels when he/she breaks the surface. Nowadays this surface marker buoy 100 fails to transmit wireless signal and can only help if the visuality is good. In the event of loss of contact by drifting, the surface marker buoy is of little help for rescue operation.

In addition, another conventional marine distress alert system is a personal locator beacon (PLB). Though PLB possesses DISTRESS function, the major shortcoming of PLB is that once the distress signal is sent, the Cospas-Sarsat system notifies salvage unit to start rescue operation. As a result, there is no way to verify its reliability before an accident. Besides, the PLB can either provide real-time tracking for the vessels to avoid an impact accident. Moreover, under normal (non-distress) conditions, the PLB cannot be used to call the vessels to pick up the divers. Also, the waterproof performance of commercially available PLB is not suitable for divers (IP67).

Furthermore, a walkie-talkie type marine safety device for diver has been proposed. This device employs analog signal with communication range typically less than 3 kilometers. If a great number of people use this device at the same time, mutual interference would occur. Due to limited effective communication range, this device is help little in marine rescue. Other relevant device uses AIS (Automatic Identification System) channel to send the distress signal in event of accident to pretend as a shipwreck accident. However the AIS distress signal requires the Maritime Mobile Service Identity (MMSI). This means that the diver must have a MMSI for his own, and the nearby vessels must be equipped with a VHF AIS receiver to make the distress call to be valid. Unfortunately, a lot of countries do not allow individuals but ships to apply a MMSI. In other words, the distress call may be disregarded in many countries/regions.

There is another marine safety device that is commercially available for tracking the GPS coordinate of individuals at sea by radio frequency (RF) transmitter/receiver. Nonetheless, divers rarely use this kind of marine safety device. This is because: (1) the effective transmission range of this marine safety device is about 10 kilometers only, and thus this marine safety device can only provide limited help for the rescue operation of missing persons at sea; (2) it lacks of suitable communication protocols. If many people use this device at the same time, mutual signal interference might occur, and would in turn result in communication difficulties; (3) The receiver is 5 kilograms not suitable for travel; (4) The functional design of the software does not include precautionary alerts such as: Impact Alert between diver and vessel, Out of Safe Zone Alert; and Loss of Signal Alert.

In conclusion, the conventional technology for personal safety in marine activities has deficiencies in performance. Therefore, there is necessity to adapt the design of the marine beacon system to ensure the safety of people involved with marine activity.

SUMMARY OF THE INVENTION

Technical Solution

An object of the invention is to provide a marine beacon system for addressing the deficiencies of the prior art. A transmitter carried by individual, a receiver installed on the vessel or installed onshore, and a smart device compose a personal safety monitoring and tracking solution for marine activities. The system employs a built-in communication protocol with time division technique to effectively achieve multiple(transmitters)-to-multiple(receivers) communication with a single RF channel. That is, it can let multiple transmitters and multiple receivers to be used at the same time without compromising the communication quality.

The invention provides a portable marine beacon system, including at least one transmitter, at least one receiver, and at least one smart device. Each of the at least one transmitter is carried by one user. Each of the at least one receiver may be placed on a vessel, on the coast, or in land, and conduct RF wireless communication with the at least one transmitter to receive data therefrom. The smart device can conduct Wi-Fi communication with the at least one receiver to receive and process data of the at least one receiver respectively. Each of the at least one smart device includes a central processing unit (CPU), a main memory, and a touch screen. The main memory includes an App for real-time tracking of transmitters. The CPU is instructed to execute the App having a Transmitter Management Interface, an Activity Planning Interface (or Alert Setting Interface), a Security Patrol Interface (or Safety Surveillance/Monitoring Interface), and a Record Playback Interface (or History Playback Interface) through the touch screen to provide the user offshore and onshore positioning/distress alert and precautionary safety protection functions for marine activities.

The transmitter includes a mainboard, a wireless charging module, an illumination and display module, a power supply unit, and a global positioning system (GPS) module. The mainboard has a microprocessor (MCU), a main memory, a RF module, and multiple magnetic sensors. The RF module includes an antenna. These magnetic sensors convert magnetic variation into voltage high/low alteration as an ON/OFF control signal to the microprocessor. The GPS module includes a GPS antenna for positioning. The wireless charging module is wirelessly powered by a charging mat from outside to charge the battery and power supply unit. The power supply unit supply power to the mainboard, the illumination and display module, the GPS module.

The receiver includes a mainboard, a wireless charging module, an illumination and display module, a power supply unit, and a Wi-Fi module. The mainboard has a microprocessor (MCU), a main memory, a RF module, and multiple magnetic sensors. The RF module includes an antenna. These magnetic sensors convert magnetic variation into voltage high/low alteration as an ON/OFF control signal to the microprocessor. The Wi-Fi module includes an antenna for communicating with the smart device. The wireless charging module is wirelessly powered by a charging mat from outside to charge the battery and power supply unit. The power supply unit supply power to the mainboard, the illumination and display module, the Wi-Fi module.

In the above descriptions, the transmitter and the receiver can be integrated into a transceiver which can be set for operation of a transmitter or a receiver by switching the switches.

The front of transceiver is designed with five slide switches, including: (1) an illumination switch; (2) a receiver setting switch; (3) a transmitter setting switch; (4) a transmitter DISTRESS function switch; and (5) a transmitter OK function switch. By simultaneously turning on the receiver setting switch and the transmitter setting switch, transceiver can be set to an auto-testing mode for the transmitter thereof to transmit the auto-testing data to the receiver of another transceiver and display these data on the touch screen of a corresponding smart device through Wi-Fi communication.

In the above descriptions, the transceiver can be set to a transmitter mode. The tracking data can be sent by the transmitter setting switch and a built-in firmware. The tracking data include: (1) an identification code; (2) a latitude and a longitude; and (3) a status code. The status code can indicate four status: OK status, DISTRESS status, DISTRESS TERMINATING status and TESTING status. Under the TESTING status, the transceiver can transmit the auto-testing data.

The auto-testing data include: a model number of the transmitter; an indication of whether switching functions of all the switches is normal; a remaining power level of the battery; and an indication of whether the GPS positioning is successful and its positioned latitude and longitude.

In the above descriptions, the transceiver can be set to a receiver mode. The receiver can receive the identification code of the transmitter, the latitude and the longitude; the status code, and the auto-testing data at the same time, and send these data to a corresponding smart device through Wi-Fi communication. The central processing unit (CPU) of the corresponding smart device can execute the App for real-time tracking and manage, analyze, record, and share these data to provide the distress alert and precautionary safety protection functions by manipulating the touch screen.

The Security Patrol Interface (or Safety Surveillance/Monitoring Interface) of the touch screen has the following features: (1) automatic interconnection of the receiver and the smart device; (2) touch panel operation; (3) provide pull-down function menus on the left and right sides of the screen; (4) display of navigation direction; (5) display of proportional scale; (6) display of a compass; (7) zoom-in/out of the radar chart; and (8) browsing and scrolling operation of the radar chart.

In the above descriptions, the Transmitter Management Interface has the following functions: (1) quick selection of IDs of transmitters and grouping; (2) display of the auto-testing data of the transmitter and the receiver.

The Activity Planning Interface (or Alert Setting Interface) has the following functions: configuration of a safe zone range and a safe time range of an activity for each group set through the Transmitter Management Interface.

The Security Patrol Interface (or Safety Surveillance/Monitoring Interface) provides the following functions: (1) monitoring the ID/location/status data of all activity players on a real-time basis; (2) in the event of hazard, the App automatically activates an audible alarm and on-screen alerts. These alerts have four following type: (2d) DISTRESS (SOS) alert and other precautionary alerts for safety protection: (2a) human-vessel impact (collision) alert; (2b) loss of signal (over time) alert; (2c) out of safe zone (over distance) alert.

The Record Playback Interface (or History Playback Interface) has the functions of replaying, sharing, deleting, and recording historical GPS data of the at least one transmitter throughout entire period of an activity.

The smart device may be a smartphone, a tablet computer, or a laptop computer.

Benefits of the Invention

One of the advantages of the invention is that the receiver and the transmitter can be integrated into a single transceiver. This can simplify the manufacturing process, enhance the yield, simplify the certification procedure in different countries and lower the certification cost.

Another advantage of the invention is that all the modules within the transmitter and the receiver are not connected to each other with cables but with board-to-board connectors. This can suppress the adverse temperature effect against the sheath of the cables, thus enhancing the yield of assembly and prolonging the lifespan of the transceiver.

Another yet advantage of the invention is that the transmitter and the receiver employ inductive magnetic switch and a wireless charging technique to render a seamless housing surface, which would in turn result in a high-level hermetic and waterproof performance.

Besides, the invention possesses an advantage that the transmitter and the receiver employ a built-in communication protocol and a time-division technique to achieve multiple (transmitters) to multiple (receivers) communication simultaneously with a single RF channel.

Next, an exemplary embodiment will be given below to illustrate the best mode of the invention. Through this embodiment, the technical methods, advantages, and constitution of the inventions can be readily understood by an artisan skilled in the related art.

BRIEF DESCRIPTION OF THE DRAWINGS

To illustrate the technological scheme embodying the embodiment of the invention clearly, the accompanying drawings showing the embodiment of the invention or the conventional technology will be briefed in the following. Apparently, the accompanying drawings stated below are merely affiliated to this embodiment of the invention, but it is only for illustration and does not constitute a limitation to the present invention.

DETAILED DESCRIPTION OF PREFERRED EMBODIMENTS

Next, the invention will be elaborated clearly and exhaustively with reference to the accompanying drawings. Apparently, the embodiments described herein are merely taken as being illustrative in nature but not limiting to the scope of the disclosure. Based on the embodiments disclosed herein, any embodiments derived by an artisan skilled in the art without inventive laboring should be encompassed in the scope of the disclosure.

Figure 1B:
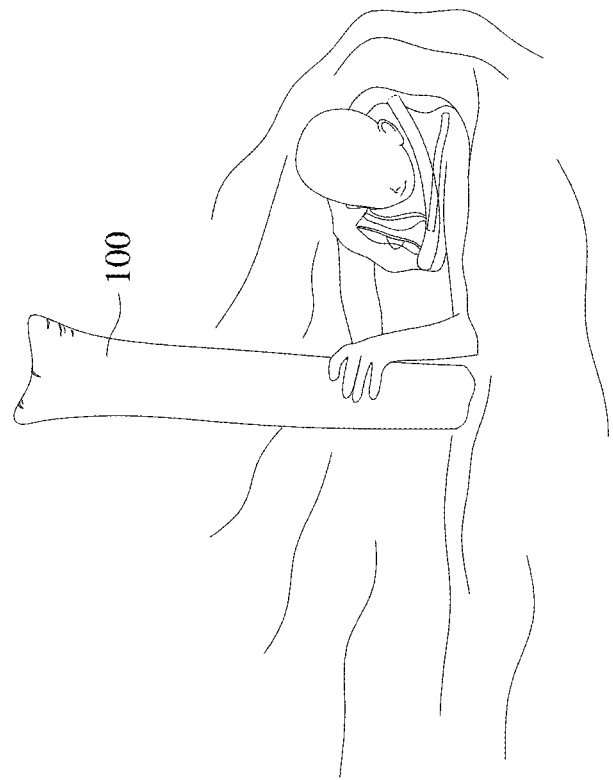
FIG. 1b is a schematic diagram showing a diver holding a surface marker buoy according to the prior art.
Figure 1A:
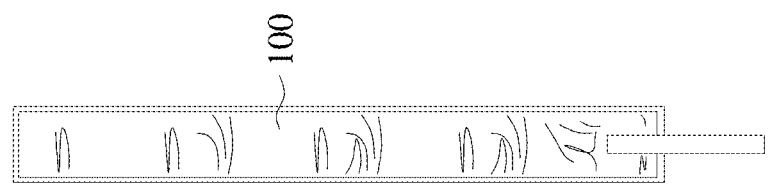
FIG. 1a is a schematic diagram showing a conventional surface marker buoy for use by a diver according to the prior art.
Figure 2:
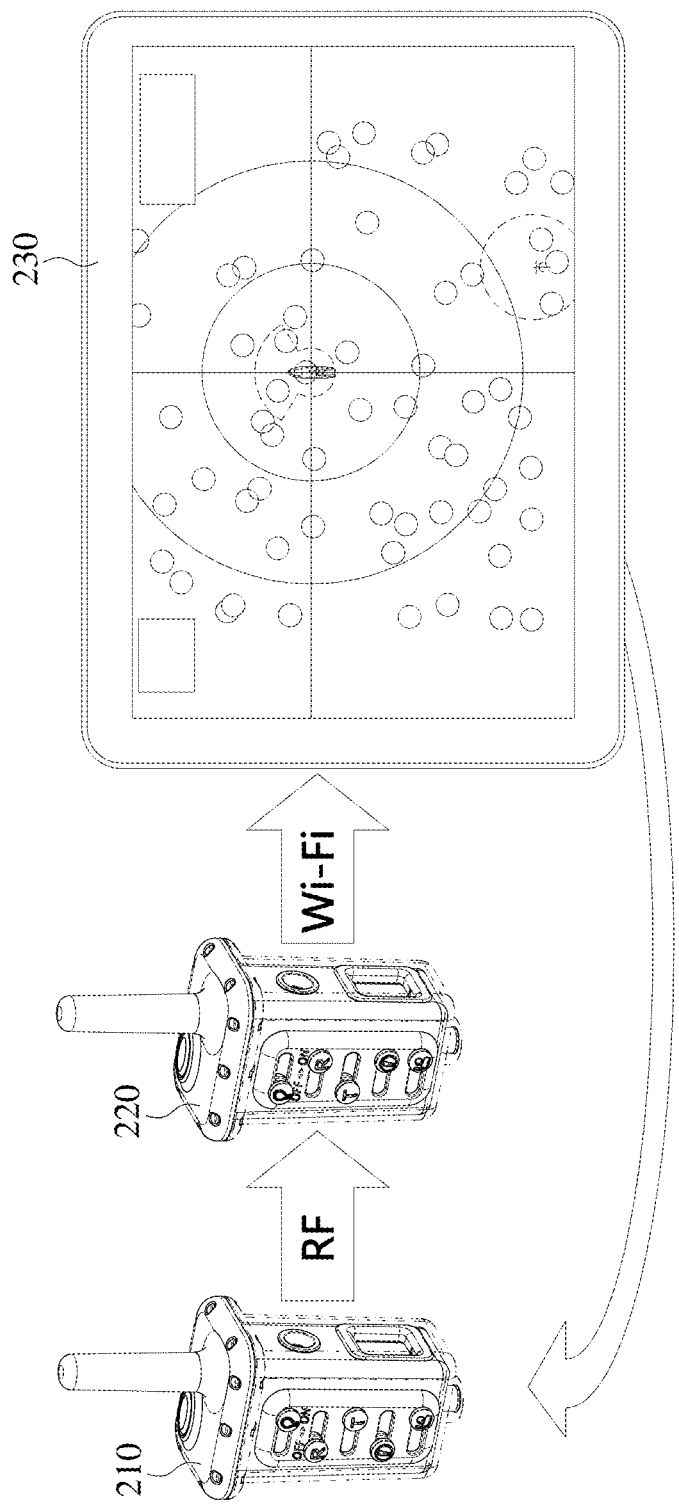
FIG. 2 is a schematic diagram showing a portable marine beacon system according to the invention.

First, referring to FIG. 2, a portable marine beacon system according to the invention is illustrated. As shown in FIG. 2, the portable marine beacon system 200 includes a transmitter 210, a receiver 220, and a smart device 230. The transmitter 210 is used to transmit radio frequency (RF) signals to the receiver 220. The receiver 220 then forwards the received signals to the smart device 230 by way of Wi-Fi transmission. The smart device 230 then displays ID/location/status data on a touch screen of the smart device 230.

Figure 3:
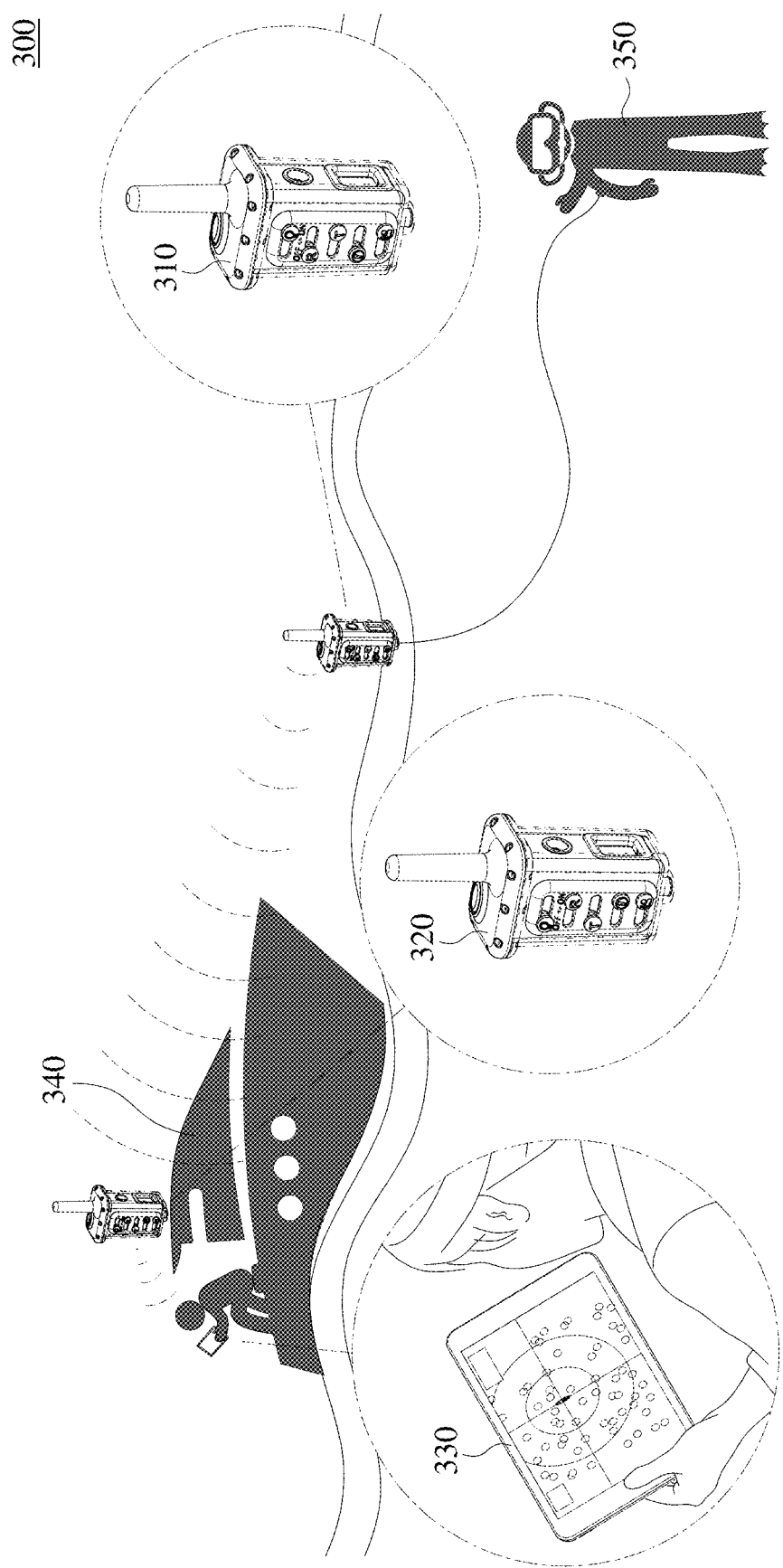
FIG. 3 is a schematic diagram showing a scene of using the portable marine beacon system according to the invention.

Next, referring to FIG. 3, a scene of using the portable marine beacon system according to the invention is illustrated. As shown in FIG. 3, a diver 350 transmits the ID/location/status data to the receiver 320 by RF communications through the transmitter 310. The receiver 320 then transmits the received ID/location/status data to the smart device 330 by way of Wi-Fi communication. The ID/location/status data is shown on the touch screen of the device 230. In this embodiment, the receiver 320 and the smart device 230 are placed on a vessel 340 or placed offshore or onshore.

Figure 4:
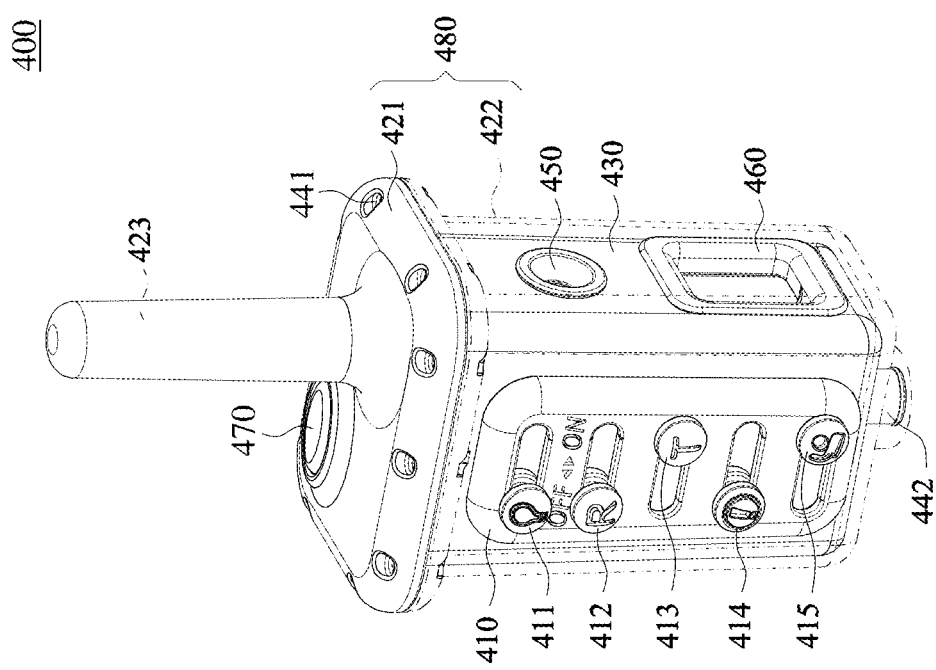
FIG. 4 is a schematic diagram showing the structure of a transceiver in the portable marine beacon system according to the invention.

Next, referring to FIG. 4, a structure of a transceiver in the portable marine beacon system according to the invention is illustrated. As shown in FIG. 4, the transceiver 400 includes an outer upper housing 421, a transparent outer lower housing 422, a waterproof O-ring (placed between the outer upper housing and the outer lower housing, not shown), an internal housing 430, a switch guiding plate 410, five slide switches 411-415, an illumination LED cover 450, a display bezel 460, a company logo 470, a projecting RF antenna 423, multiple screws 441, and a bottom bolt 442.

In this figure, the outer upper housing 421 and the transparent outer lower housing 422 are integrated in an up-and-down direction. The waterproof O-ring is placed between the outer upper housing 421 and the transparent outer lower housing 422 to form an outer housing 480. The multiple screws 441 are used to lock and seal the outer upper housing 421 and the outer lower housing 422. The transparent outer lower housing 422 is mounted outside the internal housing 430 to wrap around the internal housing 430. The switch guiding plate 410 is mounted on a front surface of the outer lower housing 422 with the five slide switches 411-415 mounted thereon (the five slide switches 411-415 will be discussed in detail later). Each slide switch can be slid left and right along a sliding track in one of five sliding grooves of the switch guiding plate 410. When the slide switches 411-415 are slid to the rightmost place of the sliding groove, it indicates an ON state; when the slide switches 411-415 are slid to the leftmost place of the sliding groove, it indicates an OFF state. The illumination LED cover 450 is round, and the display bezel 460 is rectangular. Viewed from the front surface of the internal housing 430, both the illumination LED cover 450 and the display bezel 460 are mounted on the right side of internal housing 430. The company logo 470 is oval and is mounted on a top surface of the external upper housing 421. The projecting RF antenna 423 of the outer upper housing 421 is sheathed for protection. The transparent outer lower housing 422 is provided with a bottom bolt 442 to fasten its bottom. When the transceiver is in a transmitter mode, a rope may be used to fix between transceiver and the person using it. When the transceiver is in a receiver mode, other accessory may be used to fix the receiver to the vessel.

The five slide switches that are mounted on the front surface of the transceiver 400 are: (1) an illumination switch 411; (2) a receiver setting switch 412; (3) a transmitter setting switch 413; (4) a transmitter DISTRESS function switch 414; and (5) a transmitter OK function switch 415. By simultaneously turning on the receiver setting switch 412 and the transmitter setting switch 413, the transceiver is set to be under a auto-testing mode for transmitter to transmit the auto-testing data of the transmitter to the receiver. The auto-testing data are then displayed on the touch screen of the smart device 230 by way of Wi-Fi communication.

Figure 5:
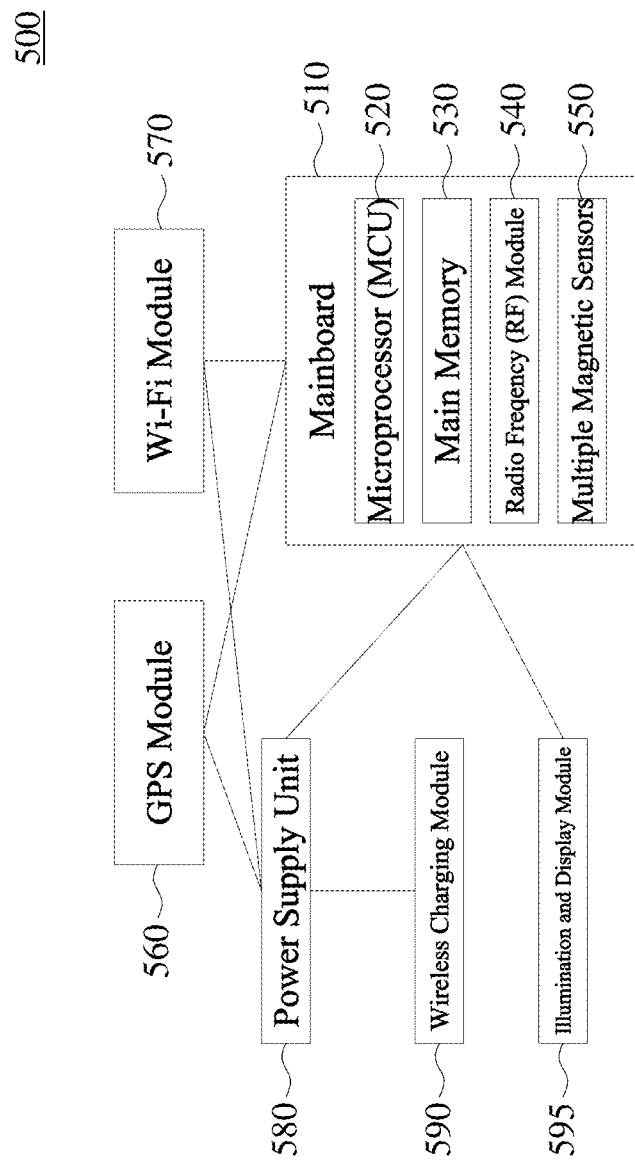
FIG. 5 is a functional block diagram of a transceiver in the portable marine beacon system according to the invention.

Next, referring to FIG. 5, a functional block diagram of the transceiver in the portable marine beacon system according to the invention is shown. As shown in FIG. 5, the transceiver 500 includes a mainboard 510, a GPS module 560, a Wi-Fi module 570, a power supply unit 580, a wireless charging module 590, and an illumination and display module 595. The mainboard 510 is provided with a microprocessor (MCU) 520, a main memory 530, a radio frequency (RF) module 540, and multiple magnetic sensors 550. The RF module 540 includes an antenna. These magnetic sensors 550 are used to convert magnetic variation into voltage high/low alteration as an ON/OFF control signal to the microprocessor (MCU) 520. The wireless charging module 590 is wirelessly powered by a charging mat from outside to charge the battery and power supply unit. The power supply unit 580 is used to supply power to each module inside the transceiver. The GPS module 560 includes an antenna for GPS positioning. The Wi-Fi module 570 includes an antenna for communicating with the smart device 230. The magnetic sensors 550 can sense the magnetic variation arising from operation of external (magnetic) switches. The transceiver 500 can be set in a transmitter mode. Under this condition, the Wi-Fi module 570 is not needed to be activated. Alternatively, the transceiver 500 can be also set in a receiver mode. Under this condition, the Wi-Fi module 570 is needed to be activated.

As stated above, the mainboard 510-550 and each module 560-595 shown in FIG. 5 are mounted inside the internal housing 430 shown in FIG. 4.

According to the invention, the power supply unit 580 includes two 2600-3200 mAh rechargeable lithium batteries. These rechargeable lithium batteries can last at least 60 hours for continuous operation under the transmitter mode. Under the standby mode, these rechargeable lithium batteries can sustain for more than one week. However, the specification of the power supply unit 580 of the invention should not be limited to the accurate form disclosed herein. The weight of the transceiver 400 is about 290 grams. The dimensions (height, width, depth) of the transceiver 400 are 10.2×6.7×5.7 centimeter/6.1×1.5 centimeter (height, diameter of antenna). The maximum communication range is about 100 kilometers. The suitable operating temperature is 0-60° C. The outer housing 480 is made of polycarbonate (PC). The outer lower housing 422 is transparent. The outer upper housing 421 usually has the same color with the internal housing 430. The internal housing 430 is made of acrylonitrile butadiene styrene (ABS) and may be colored in a variety of colors. However, the specification of the internal housing of the invention should not be limited to the accurate form disclosed herein. In the present invention, the transmitter is analogous to a radio broadcasting station, and the receiver is analogous to a radio receiver. Each receiver can monitor more than 100 transmitters at the same time to achieve multiple (transmitters)-to-multiple (receivers) communication in a time-division manner with only a single RF channel.

Figure 6:
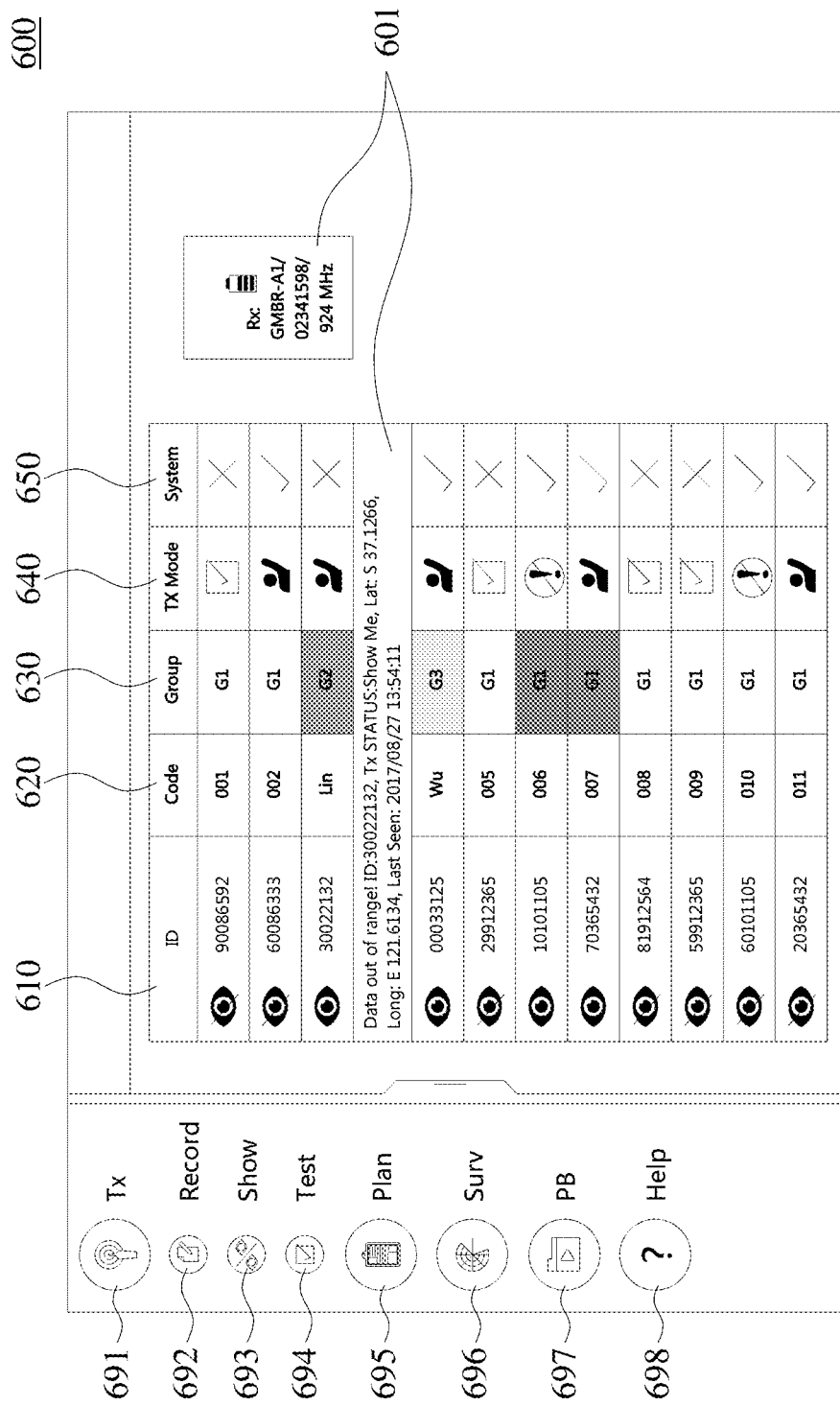
FIG. 6 is a schematic diagram showing a Transmitter Management Interface of the portable marine beacon system according to the invention.

Next, referring to FIG. 6, a Transmitter Management Interface of the portable marine beacon system has the following functions: (1) quick selection of transmitters/IDs and grouping, as indicated by the reference numerals 610, 620, 630, 692, 693, 694 of FIG. 6; and (2) display of the auto-testing data of the transmitter and the receiver, as indicated by the reference numerals 601, 640, 650. In FIG. 6, a table header on the uppermost row represents: 610: transmitters ID (click this field and the whole column is resorted); 620: Code/Set ID code to display; 630: Group/Set groups; 640: Tx Mode/Transmitter (Personnel) status; 650: System/Display if system check is pass. A left-side pull-down function menu includes: 691: Tx/Redirect to the Transmitter Management Interface; 692: Record/Store configuration data; 693: Show/Hide or show the entire transmitters to the display list; 694: Test/Add transmitters under test to the display list; 695: Plan/Redirect to the Activity planning Interface (or the Alert Setting Interface); 696: Surv/Redirect to the Security Patrol Interface (or the Safety Surveillance/Monitoring Interface); 697: PB/Redirect to the Record Playback Interface (or the History Playback Interface); 698 Help/Get help from users guide.

Figure 7:
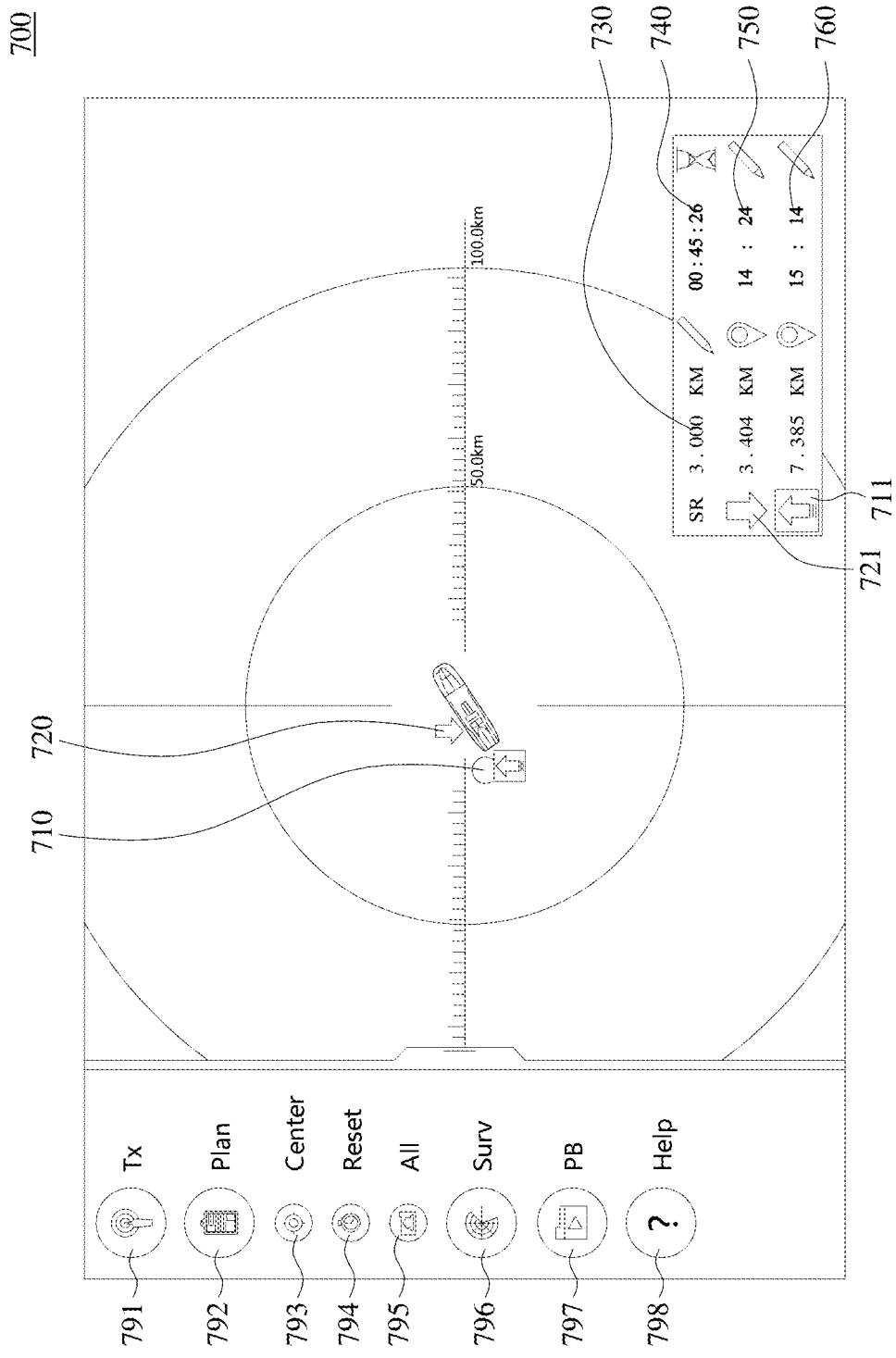
FIG. 7 is a schematic diagram showing an Activity Planning Interface (or Alert Setting Interface) of the portable marine beacon system according to the invention.

Next, referring to FIG. 7, the Activity planning Interface (or the Alert Setting Interface) of the portable marine beacon system according to the invention is illustrated. As shown in FIG. 7, this interface has the following functions to ensure that based on the groups set by the Transmitters Management Interface, the safe activity range and activity planning for each group can be configured. In FIG. 7, its left-side pull-down function menu includes: 791: Tx/Redirect to the Transmitter Management Interface; 792: Plan/Redirect to the activity planning Interface (or the Alert Setting Interface); 793: Center/Mark the coordinates of the receiver (vessel) at the center of a radar chart; 794: Reset/Reset to default values of alert setting; 795: All/Show all alert settings; 796: Surv/Redirect to the Security Patrol Interface (or the Safety Surveillance/Monitoring Interface); 797: PB/Redirect to the Record Playback Interface (or the History Playback Interface); 798: Help/Get help from user guide. In the radar chart of FIG. 7, reference numeral 710 indicates that a planned exit point of a group out of the water can be set by long tap on location of radar chart for one second, and reference numeral 720 indicates that a planned entry point of the group into the water can be set by long tap on location of radar chart for one second. After the setting is done, the distances between the vessel and the exit/entry point 711/721 are shown in the lower-right part of the radar chart. In FIG. 7, if the user clicks options marked by the pencil icons in the lower-right part of the radar chart, the following settings can be configured: Clicking reference numeral 730/SR can set a safe range for the group; clicking reference numeral 750 can set a planned entry time of the group into the water; clicking reference numeral 760 can set a planned exit time of the group out of the water. The sandglass icon 740 is an automatically count down clock from the time set for an alert.

Figure 8:
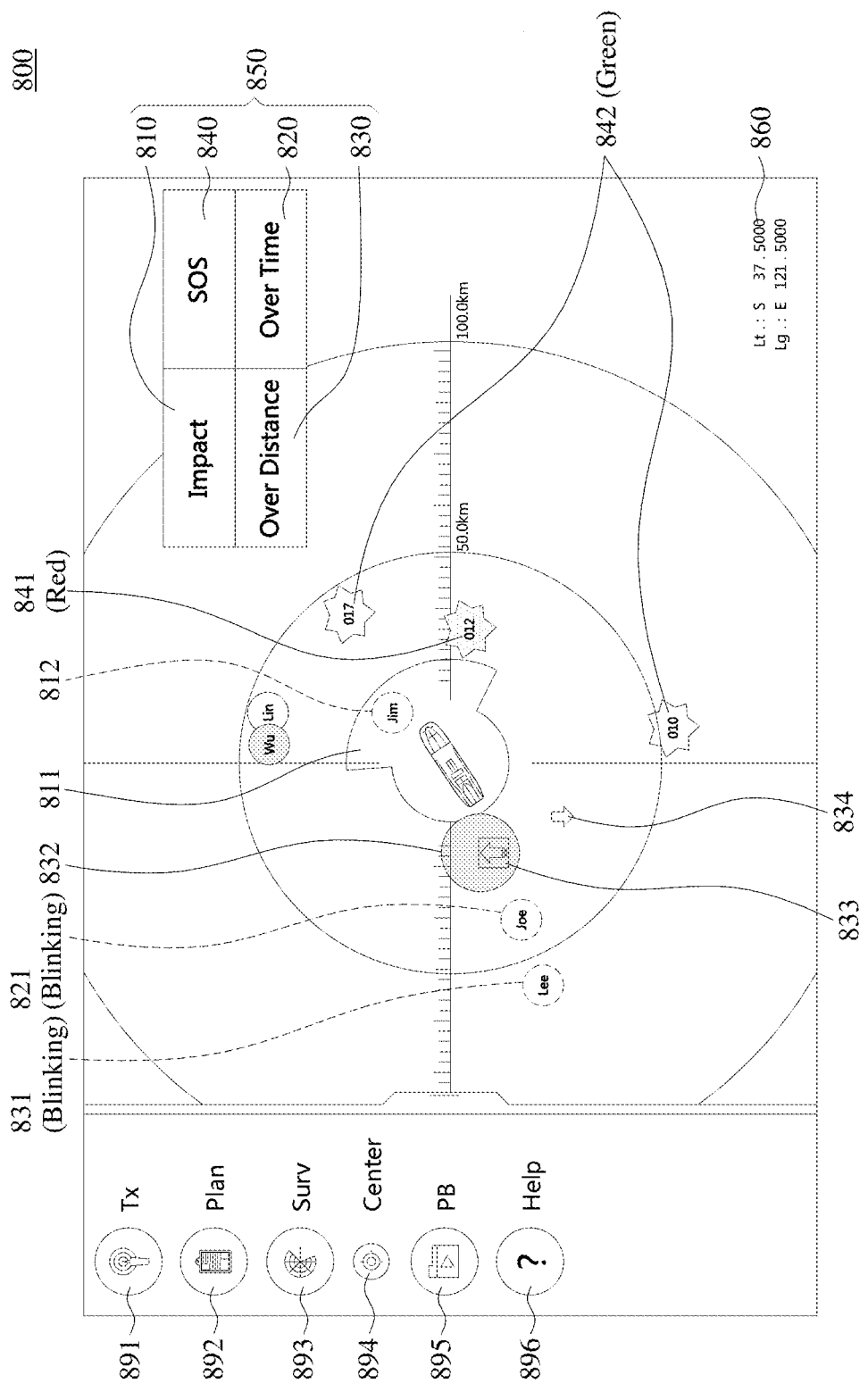
FIG. 8 is a schematic diagram showing a Security Patrol Interface (or Safety Surveillance/Monitoring Interface) of the portable marine beacon system according to the invention.

Next, referring to FIG. 8, the Security Patrol Interface (or Safety Surveillance/Monitoring Interface) of the portable marine beacon system according to the invention is illustrated. This interface has the following functions: (1) monitor the ID/location/status of all transmitters on a real-time basis; (2) in the event of hazard, automatically trigger an audible alarm and an alert notification 850 on the screen. Each alert notification has four types of alerts, as shown in FIG. 8, including precautionary alerts for safety protection: (2a) human-vessel impact (collision) alert; (2b) loss of signal (over time) alert; (2c) out of safe zone (over distance) alert; and (2d) DISTRESS (SOS) alert 840. Reference numeral 860 indicates the coordinates of a vessel, i.e. the coordinates of the smart device 230. In FIG. 8, the vessel is located at the center of the radar chart. Each icon (circle or star shape) indicates ID/location/status data of a person (transmitter). The upward pointing arrow 833 indicates the exit point (out of the water) of a dive group. The downward pointing arrow 834 indicates the entry point (into the water) of a dive group.

In the above descriptions, the precautionary alert for collision 810 in (2a) is used to provide a collision warning on the monitoring screen and an audible alarm with respect to any transmitter data detected inside a hazardous zone with risk of collision between human and vessel. Reference numeral 811 represents the area of the hazardous zone. This hazardous zone includes a sector of 135° ahead of the vessel (receiver) with a radius 1 kilometer and a circular area with a radius 500-meter within which the vessel is located. If a person (transmitter), such as Jim 812, is detected to be located within this hazardous zone, the alert is triggered. When this alert is triggered, the icon of person and alert 810 shown on the screen will blink together with an audible alarm.

The loss of signal (over time) alert 820 in (2b) is triggered if a person (transmitter), for example Joe 821, does not send data by the end of the planned exit time, the alert 820 and the icon (last coordinates) of Joe will blink together with an audible alarm.

The over distance alert 830 (2c) is triggered if a person (transmitter), for example Lee 831, is located outside a safe zone, the alert 830 will blink together with an audible alarm and the icon of the person will be blinking. The circle zone 832 represents the safe zone for activity configured for a group of persons.

The distress (SOS) alert 840 in (2d) is initiated by a transmitter 841 (person 012). When this alert is triggered, the alert 840 will blink together with an audible alarm and the original icon of the person issuing the distress call will be replaced by a red star. After a DISTRESS Status is triggered, only swapping between DISTRESS status and DISTRESS TERMINATING status is allowed. Once the Distress status is ended, the transmitter will automatically issue a distress terminating notification which will be shown on the screen as a green star 842 (persons 010, 017) continuously for one hour, allowing the neighboring ships to know that the person has been rescued to avoid futile rescue.

In FIG. 8, the left-side pull-down function menu includes: 891: Tx/Redirect to the Transmitter Management Interface, 892: Plan/Redirect to the Activity planning Interface (or Alert Setting Interface); 893: Surv/Redirect to the Security Patrol Interface (or Safety Surveillance/Monitoring Interface); 894: Center/Mark the coordinates of the vessel at the center of the screen; 895: PB/Redirect to the Record Playback Interface (or History Playback Interface); and 896: Help/Get help from users guide.

In the above descriptions, the icons of the transmitter in screen will be marked by different color and shape in radar chart to handle various status. However, the drawings of the present invention are prepared in black and white instead of colorful drawings.

Figure 9:
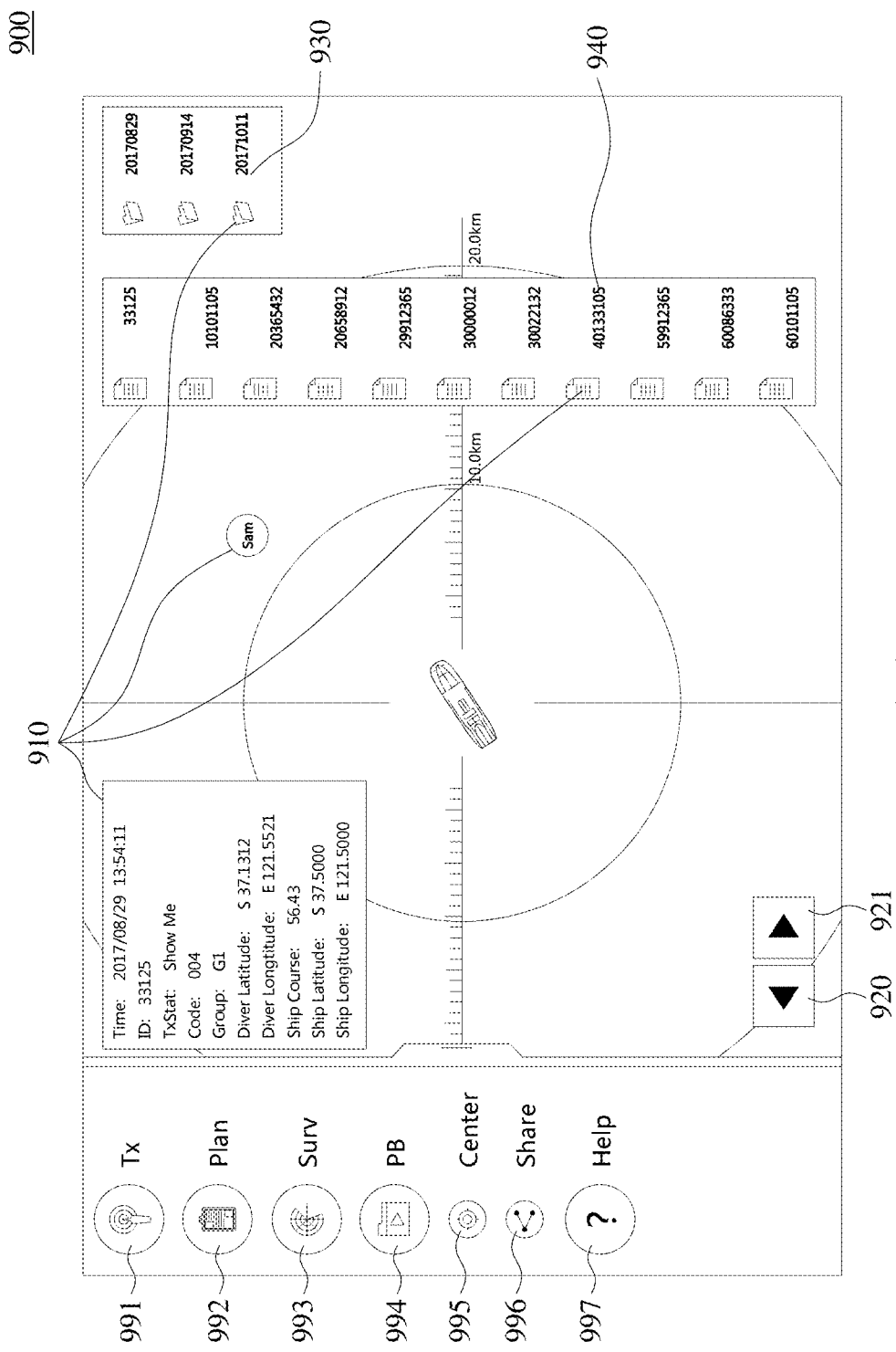
FIG. 9 is a schematic diagram showing a Record Playback Interface (or History Playback Interface) of the portable marine beacon system according to the invention.

Eventually, referring to FIG. 9, the Record Playback Interface (or History Playback Interface) in the portable marine beacon system according to the invention is illustrated. In FIG. 9, this interface has the functions to replay/share/delete recorded historical data of all transmitters in entire activity. The user first selects the date 930 from the right-side pull-down function menu and then selects the recorded data 910 of the person 940, Sam. Sam's coordinates will then be shown on the screen. The backward/forward buttons 920 and 921 can be clicked to show the previous/next data. The left-side pull-down function menu includes: 991: Tx/Redirect to the Transmitter Management Interface, 992: Plan/Redirect to the Activity Planning Interface (or Alert Setting Interface); 993: Surv/Redirect to the Security Patrol Interface (or Safety Surveillance/Monitoring Interface); 994: PB/Redirect to the Record Playback Interface (or History Playback Interface); 995: Center/Mark the coordinates of the vessel at the center of the screen; 996: Share/share or delete the recorded historical data; and 996: Help/Get help for operations.

In the present invention, the transceiver can attain high-level hermeticity and waterproof by means of the following special designs:

1. Inductive magnetic switch: The aforesaid five slide switches each contains a magnet sealed therein. When the slide switch is moved to the leftmost position (OFF) or to the rightmost position (ON), the magnetic sensors will convert magnetic variation into voltage high/low alteration as an ON/OFF control signal to the microprocessor, thereby accomplishing the ON and OFF operation. As a result, the invention can rule out the disadvantage of conventional switches that water could permeate into the housing through the apertures on the surface of the housing caused by the switches mounted on the housing. Hence, the invention can ensure the integrally formed nature and the waterproof quality of the housing.

2. Wireless charging: The traditional charging method using wire requires the use of a power socket, which is against the requirements of the housing for being integrally formed and waterproof. The present invention uses wireless charging at the absence of any socket and wires, so there is no sacrifice in waterproof requirement due to charging needs.

By virtue of the design of the invention, the transceiver of the invention is resistant to a underwater pressure up to 13 Bar, and in turn is suitable for technical diver at a depth of 120 meters or more.

The portable marine beacon system invention can integrate a receiver and a transmitter into a single transceiver to simplify the manufacturing process and enhance the yield. Also, the invention can simplify the certification process and lower the certification cost in various countries and increase the flexibility for use.

INDUSTRIAL PRACTICABILITY

In summary, compared to the prior art, the invention is advantageous over the prior art in terms of the following aspects:

1. The invention provides a Marine Beacon Manager App for real-time tracking application. This App provides operations of the Transmitter Management Interface, the Activity Planning Interface (or the Alert Setting Interface), the Security Patrol Interface (or the Safety Surveillance/Monitoring Interface), and the Record Playback Interface (or the History Playback Interface) through the touch screen. Thus, the invention can provide the user with positioning/distress alert at sea and in land and precautionary safety protection functions comprehensively.

2. The transceiver employs inductive magnetic switch and a wireless charging technique to accomplish a seamless housing, thereby achieving the high-level hermetic and waterproof performance.

3. The invention employs a single RF channel and a time-division technique to conduct multiple (transmitters) to multiple (receivers) communication without occupying excessive frequency channels.

4. The invention can conduct autonomous communication without the need of any other network or Internet. Hence, the invention can be applied in a remote area onshore or offshore, even in a marine accident or in case of a devastating earthquake ravaging the existing communication systems.

What is claimed is:

1. A portable marine beacon system, comprising:
    at least one transmitter adapted to be carried by at least one user respectively;
    at least one receiver wirelessly communicating with the at least one transmitter respectively by way of radio frequency (RF) communications to respectively receive data from the at least one transmitter, each of the at least one receiver adapted to be mounted on a vessel, onshore, or in land; and
    at least one smart device conducting Wi-Fi (Wireless Fidelity) wireless communications with the at least one receiver to receive data of the at least one receiver respectively, each of the at least one smart device including a microprocessor, a main memory, and a touch screen, wherein the main memory includes a marine beacon manager application (App) launched by the microprocessor to execute the marine beacon manager application (App) having a Transmitter Management Interface, an Activity Planning Interface, a Security Patrol Interface, and a Record Playback Interface through the touch screen to provide offshore and onshore positioning and distress alert and precautionary safety protection functions;

wherein each of the at least one transmitter and one of the at least one receiver are integrated into a transceiver with two operation modes switchable through a setting of multiple switches of the transceiver, and when the transceiver is set as a receiver, the receiver receives data including an identification code, a latitude and a longitude, a status code, and auto-testing data of the transmitter, and transmits received data to one of the at least one smart device through Wi-Fi communication for the microprocessor of the smart device to execute the marine beacon manager application (App) through the touch screen to manage, analyze, record, and share the received data and provide the distress alert and the precautionary safety protection functions.

2. The portable marine beacon system according to claim 1, wherein each of the at least one transmitter includes:
a mainboard having a microprocessor, a main memory, a radio frequency module, and multiple magnetic sensors, wherein the radio frequency module includes an antenna, and the magnetic sensors convert magnetic variation into voltage high/low alteration as an ON/OFF control signal to the microprocessor in the mainboard;
a power supply unit;
an illumination and display module;
a global positioning system (GPS) module including an antenna for GPS positioning; and
a wireless charging module wirelessly powered by a charging mat from outside to charge the battery and power supply unit.

3. The portable marine beacon system according to claim 1, wherein each of the at least one receiver includes:
a mainboard having a microprocessor, a main memory, a radio frequency module, and multiple magnetic sensors, wherein the radio frequency module includes an antenna, and the magnetic sensors convert magnetic variation into voltage high/low alteration as an ON/OFF control signal to the microprocessor in the mainboard;
a power supply unit;
an illumination and display module;
a Wi-Fi module including an antenna for communicating with the smart device; and
a wireless charging module is wirelessly powered by a charging mat from outside to charge the battery and power supply unit.

4. The portable marine beacon system according to claim 2, wherein a front surface of each the at least one transceiver is provided with five switches including an illumination switch, a receiver setting switch, a transmitter setting switch, a transmitter DISTRESS function switch, and a transmitter OK function switch, wherein by simultaneously turning on the receiver setting switch and the transmitter setting switch, the transceiver is set to an auto-testing mode for the transmitter thereof to transmit the auto-testing data of the transmitter to the receiver of another transceiver and display the auto-testing data on the touch screen of a corresponding smart device by Wi-Fi communication.

5. The portable marine beacon system according to claim 4, wherein when one of the transceiver is set to a transmitter mode, the transmitter sends signals by the transmitter setting switch and a built-in firmware, and data sent by the transceiver includes an identification code, a latitude and a longitude, and a status code, wherein the status code is one of an OK status, a DISTRESS status, a DISTRESS TERMINATING status and a TESTING status, wherein the transceiver transmits the additional auto-testing data under the TESTING status.

6. The portable marine beacon system according to claim 4, wherein that when the additional auto-testing data includes a model of the transmitter, an indication of whether switching functions of all the switches is normal, a remaining battery level, an indication of whether GPS positioning is successful, and the positioned latitude and longitude.

7. The portable marine beacon system according to claim 1, wherein the distress alert and the precautionary safety protection functions include automatically connecting the receiver to the smart device, allowing operation of the touch screen, providing pull-down function menus on the left side and on the right side of the touch screen, showing a navigation direction, showing a proportional scale, showing a compass, zooming in/out a radar chart; and browsing and scrolling the radar chart.

8. The portable marine beacon system according to claim 1, wherein the Transmitter Management Interface has functions of quick selection of IDs of transmitters, grouping, and display of the auto-testing data of the transmitter and the receiver.

9. The portable marine beacon system according to claim 1, wherein the Activity Planning Interface serves to set the safe zone range and the safe time range of an activity for each group set through the Transmitter Management Interface.

10. The portable marine beacon system according to claim 1, wherein the Security Patrol Interface patrols the at least one transmitter and checking locations, identifications and statuses thereof on a real-time basis, and automatically activates an audible alarm and an alert notification on the touch screen, wherein the alert notification includes four types of alerts including DISTRESS (SOS) alert and precautionary alerts for human-vessel impact (collision) alert; loss of signal (over time) alert; out of safe zone (over distance) alert.

11. The portable marine beacon system according to claim 1, wherein the Record Playback Interface (or History Playback Interface) allows to replay, share, delete, and record historical GPS data of the at least one transmitter throughout entire period of an activity.

12. The portable marine beacon system according to claim 1, wherein the smart device is one of a smartphone, a tablet computer, and a laptop computer.

13. The portable marine beacon system according to claim 1, wherein all modules in each of the at least one transmitter and the at least one receiver are connected to each other with board-to-board connectors instead of cables.

14. The portable marine beacon system according to claim 1, wherein surfaces of a housing of each of the at least one transmitter and the at least one receiver are seamless by applying multiple inductive magnetic switches and a wireless charging technique to the transmitter and the receiver.

15. The portable marine beacon system according to claim 1, wherein when the at least one transmitter includes multiple transmitters and the at least one receiver include multiple receivers, each of the transmitters and the receivers uses a built-in communication protocol and a time-division technique to enable the multiple transmitters to communicate with the multiple receivers at the same time with a single radio frequency channel.

\* \* \* \* \*